(12) United States Patent
Laksono et al.

(10) Patent No.: US 7,634,526 B2
(45) Date of Patent: Dec. 15, 2009

(54) SELECTABLE QUANTIZATION IN AN ENCODER

(75) Inventors: Indra Laksono, Richmond Hill (CA); Jason Chan, Markham (CA)

(73) Assignee: VIXS Systems, Inc., Toronto, Ontario (CA)

( * ) Notice: Subject to any disclaimer, the term of this patent is extended or adjusted under 35 U.S.C. 154(b) by 791 days.

(21) Appl. No.: 10/917,005

(22) Filed: Aug. 12, 2004

(65) Prior Publication Data

US 2005/0010626 A1 Jan. 13, 2005

Related U.S. Application Data

(62) Division of application No. 09/906,908, filed on Jul. 17, 2001, now Pat. No. 7,058,677.

(51) Int. Cl.
*G06F 17/14* (2006.01)
*H04N 7/12* (2006.01)

(52) U.S. Cl. ............................ 708/402; 375/240.03
(58) Field of Classification Search .......... 708/400–409
See application file for complete search history.

(56) References Cited

U.S. PATENT DOCUMENTS

| | | | | |
|---|---|---|---|---|
| 4,196,448 A * | 4/1980 | Whitehouse et al. | ......... | 708/402 |
| 4,894,713 A * | 1/1990 | Delogne et al. | ............. | 708/400 |
| 5,295,077 A * | 3/1994 | Fukuoka | ...................... | 358/479 |
| 5,508,949 A * | 4/1996 | Konstantinides | ............ | 708/402 |
| 5,559,722 A * | 9/1996 | Nickerson | .................... | 708/203 |
| 5,602,594 A * | 2/1997 | Cho et al. | .............. | 375/240.05 |
| 5,608,652 A * | 3/1997 | Astle | .......................... | 708/203 |
| 5,721,822 A * | 2/1998 | Agarwal | ..................... | 708/203 |
| 5,764,553 A * | 6/1998 | Hong | ......................... | 708/400 |
| 5,784,011 A * | 7/1998 | Malladi et al. | .............. | 708/627 |
| 5,825,680 A * | 10/1998 | Wheeler et al. | ............. | 708/650 |
| 5,831,557 A * | 11/1998 | Handley | ....................... | 341/67 |
| 5,861,919 A * | 1/1999 | Perkins et al. | ............ | 348/385.1 |
| 5,881,177 A * | 3/1999 | Kim | ........................... | 708/402 |
| 6,295,546 B1 * | 9/2001 | Adiletta | ...................... | 708/402 |
| 6,330,369 B1 * | 12/2001 | Cornog et al. | .............. | 382/251 |
| 6,553,143 B2 * | 4/2003 | Miyake et al. | .............. | 382/239 |
| 6,600,836 B1 * | 7/2003 | Thyagarajan et al. | ....... | 382/239 |
| 7,007,054 B1 * | 2/2006 | Brady et al. | ................. | 708/402 |
| 7,042,941 B1 * | 5/2006 | Laksono et al. | ........ | 375/240.03 |
| 7,058,677 B1 * | 6/2006 | Laksono et al. | ............. | 708/402 |
| 2002/0136296 A1 * | 9/2002 | Stone et al. | ............ | 375/240.03 |

* cited by examiner

*Primary Examiner*—Chuong D Ngo
(74) *Attorney, Agent, or Firm*—Garlick Harrison & Markison; Timothy W. Markison; Bruce E. Stuckman (57) ABSTRACT

A method for selectable quantization for use in an encoder for compressing video and/or audio data includes processing that begins by receiving discrete cosine transform data of an encoded signal. The processing continues by generating a plurality of quantization matrixes of discrete cosine transform data based on a quantization table and a plurality of quantization scaling factors. The process continues by analyzing the plurality of quantization matrixes to identify one of the plurality of quantization matrixes having a best match of reduced data content and acceptable video quality. The processing continues by selecting the one of the plurality of quantized matrixes.

14 Claims, 10 Drawing Sheets

SELECTABLE QUANTIZATION IN AN ENCODER

The present U.S. Utility Patent Application claims priority pursuant to 35 U.S.C. § 120, as a divisional, to the following U.S. Utility Patent Application which is hereby incorporated herein by reference in its entirety and made part of the present U.S. Utility Patent Application for all purposes:

1. U.S. Utility Application Ser. No. 09/906,908, entitled "Method and Apparatus of Selectable Quantization in an Encoder," filed Jul. 17, 2001, now issued as U.S. Pat. No. 7,058,677, on Jun. 6, 2006.

TECHNICAL FIELD OF THE INVENTION

This invention relates generally to data compression processing and more particularly to quantization within such data compression processing.

BACKGROUND OF THE INVENTION

As is known, MPEG (motion picture expert group) audio and video compression was developed for storing and distributing digital video and audio signals. There are currently multiple versions of MPEG standards including MPEG 1, MPEG 2, MPEG 4, and MPEG 7 with more versions likely to come. The first of the MPEG standards, MPEG 1, was developed for use with video compact disks (CDs), which have a bit rate of 1.416 megabits per second, of which 1.15 megabits was for video. MPEG 2 was developed to cover a wider range of applications including high definition television, progressive scan videos, interlaced videos, DVDs, and digital standard definition television. Such various digital formats have bit rates ranging from 1.5 megabits per second to 60 megabits per second. MPEG 4 uses an object-based approach where scenes are modeled as compositions of objects, both natural and synthetic, with which the user may interact. Visual objects in a scene are described mathematically and given a position in 2-dimensional or 3-dimensional space. Similarly, audio objects are placed in sound space. This enables the audio and video objects to be defined once and enables the viewer to change his or her viewing positions of the video and/or audio objects. MPEG 7 standardizes the description of multimedia material such as still pictures, audio and video regardless of whether the data is stored locally, in remote databases or is broadcasted.

Regardless of the MPEG standard used, the basic architecture for an MPEG encoder and an MPEG decoder are similar. For example, an MPEG encoder includes a motion compensation function, discrete cosine transform (DCT) function, quantization function, a zig-zag scan function, and an encoding function, such as run-length encoding or Huffman encoding. The motion compensation function retrieves macro blocks of data from memory for a particular frame of video. As is known, a frame of MPEG video may include an intra (I) frame, a predicted (P) frame, and/or a bi-directional (B) frame. The motion compensation function utilizes motion vectors, which specify where to retrieve a macro block of a previously decoded frame, to remove temporal redundancies between B and P frames.

The discrete cosine transform function receives the compensated macro block and performs a discrete cosine transform function thereon, where the discrete cosine transform function essentially filters the motion compensated macro block of data utilizing a plurality of coefficients organized in a matrix. The result of the discrete cosine transform function is a discrete cosine transform matrix.

The quantization function receives the discrete cosine transform matrix and, utilizing a quantization matrix, or table, quantizes the DCT matrix to limit the number of allowed values for each coefficient. As is known, the quantization function is a primary source for loss in any compression process.

The quantized data is then rendered in a zig-zag manner to produce a linear stream of data. The linear stream of data is then encoded using a run-length encoding, Huffman encoding et cetera process to produce the MPEG encoded data. An MPEG decoder includes similar components configured to perform the reverse function in the reverse order as the MPEG encoder.

Since the quantization function is a primary source for loss in MPEG encoding, a quantization table is selected to provide an accepted level of loss (i.e., an accepted video quality) for worst case encoding conditions (e.g., fast moving action within a video). While this ensures acceptable levels of video quality, it comes with the cost of processing more data than is needed in most cases (i.e., when worst case encoding conditions are not encountered). This over processing is exasperated when multiple video programs are being encoded. The same issue arises for all types of video and/or audio compression, including JPEG, MJPEG, et cetera.

Therefore, a need exists for a video and/or audio encoding method and apparatus that maintains a desired level of quality while reducing processing requirements.

DETAILED DESCRIPTION OF A PREFERRED EMBODIMENT

Generally, the present invention provides a method for selectable quantization for use in an encoder for compressing video and/or audio data. Such a method and apparatus includes processing that begins by receiving discrete cosine transform data of an encoded signal. The processing continues by generating a plurality of quantization matrixes of discrete cosine transform data based on a quantization table and a plurality of quantization scaling factors. The process continues by analyzing the plurality of quantization matrixes to identify one of the plurality of quantization matrixes having a best match of reduced data content and acceptable video quality. The processing continues by selecting the one of the plurality of quantized matrixes. With such a method and apparatus, the level of quantization may be varied from frame to frame to optimize the number of bits processed to produce encoded data while maintaining video quality.

Figure 1:
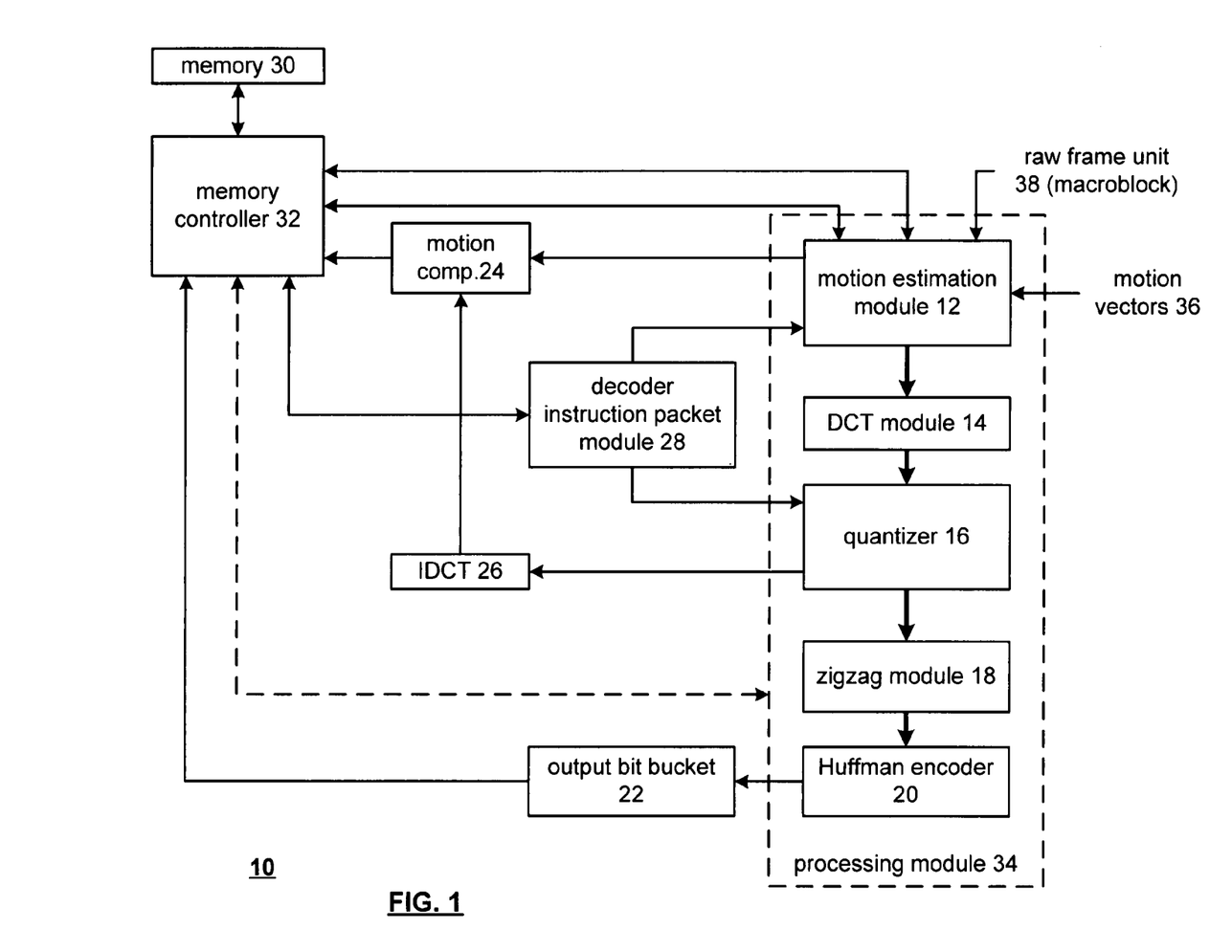
FIG. 1 illustrates a schematic block diagram of an encoder in accordance with the present invention.

The present invention can be more fully described with reference to FIGS. 1 through 12. FIG. 1 illustrates a schematic block diagram of an encoder 10. Such an encoder 10 may be utilized to encode video and/or audio data in accordance with one of the MPEG standards, JPEG standard, MJPEG standard, and/or any other technique used to compress video and/or audio data. The encoder 10 includes a motion estimation module 12, a discrete cosine transform (DCT) module 14, a quantizer 16, a zig-zag module 18, a Huffman encoder 20 (or run-length encoder, or any other type of encoder), an output bit bucket 22, memory controller 32, memory 30, motion compensation module 24, an inverse discrete cosine transform module (IDCT) 26 and a decoder instruction packet module 28. The motion estimation module 12, the DCT module 14, the quantizer 16, the zig-zag module 18 and/or the Huffman encoder 20 may be implemented utilizing processing module 34. The processing module 34 may be a single processing device or a plurality of processing devices. Such a processing device may be a microprocessor, microcontroller, microcomputer, digital signal processor, central processing unit, programmable logic array, programmable logic device, state machine, logic circuitry, and/or any device that manipulates signals (analog and/or digital) based on operational instructions. The operational instructions may be stored in memory 30. Memory 30 may be a single memory device or a plurality of memory devices. Such a memory device may be non-volatile memory, volatile memory, static memory, dynamic memory, random access memory, read-only memory, magnetic tape memory, and/or any device that stores digital information.

In operation, the motion estimation module 12 is operably coupled to receive raw frame unit data 38 in macro blocks, motion vectors 36 and to retrieve data for predicted frames and/or bi-directional frames from memory 30 via memory controller 32. In general, the motion compensation function improves compression of P and B frames by removing temporal redundancies between the frames. Such motion compensation relies on the fact that within a short sequence of the same general image, most objects remain in the same location while other objects move only a short distance. The motion is described as a 2-dimensional motion vector that specifies where to retrieve a macro block from a previously decoded frame to predict the sample values of the current macro block. After a macro block has been compressed using motion compensation, it contains both the spatial difference (motion vectors) and content difference (error terms) between the reference macro block and the macro block being coded. Macro blocks in B frames are coded using either the closest previous or future I or P frames as a reference resulting in four possible codings: (1) Intracoding, where no motion compensation is utilized, (2) forward prediction, where the closest previous I or P frame is used as a reference, (3) backward prediction, where the closest future I or P frame is used as a reference, or (4) bi-directional prediction where two frames are used as a reference, either the closest previous I frame or P frame and the closest future I or P frame.

The discrete cosine transform (DCT) module 14 receives the motion estimation data and performs a discrete cosine transform function thereon. Typically, the discrete cosine transform function operates on an 8×8 block of input samples or prediction error terms, which are processed utilizing an 8×8 DCT resulting in an 8×8 block of horizontal and vertical frequency coefficients. The result is the discrete cosine transform data, which is an 8×8 matrix block.

The quantizer 16 receives the discrete cosine transform data and quantizes the data in accordance with the concepts further described with reference to FIGS. 2 through 12. In general, the quantizer 16 will quantize the DCT data in a manner, which reduces the processing steps of the overall encoding while maintaining an acceptable level of video and/or audio quality when the compressed data is decompressed.

The zig-zag module 18 receives the quantized data and converts the quantized data, which is a matrix, for example an 8×8 block into a linear stream of quantized frequency coefficients that are arranged in an order of increasing frequency. As such, a long run of zero coefficients is produced.

The Huffman encoder 20 receives the linear stream of quantized frequency coefficients and encodes them to produce the encoded data. The functionality of a Huffman encoder, or run-length encoder is known, thus no further discussion will be presented except to further illustrate the concepts of the present invention.

The output bit bucket 20 receives the encoded data from the Huffman encoder as a serial bit stream. The output bit bucket 22 converts the serial bit stream of the encoded data into bytes of data or data words that are formatted in accordance with the size of memory 30. For instance, if a data word in memory is 1 byte, the output of the output bit bucket 22 is 1 byte. As a further example, if the memory has a memory of 32 bits or 4 bytes, the output of the output bit bucket 22 is 32 bits or 4 bytes.

The motion compensation module 24 and the IDCT module 26 are utilized to self-check the encoding process. In addition, the modules are utilized to establish a desired level of video quality. For example, the quantizer 16, as will be described in greater detail with reference to FIGS. 2 through 12, can vary the level of quantization to reduce the number of bits processed to encode the frame of data. By performing an inverse discrete cosine transform function and the motion compensation, the quantized data is converted back into the raw data. By comparing the restructured raw data with the original raw data, a determination may be readily made as to whether the level of quantization is at a sufficient level to ensure video quality. For example, if the recaptured frame data is substantially similar to the raw data, the quantization level utilized by quantizer 16 may be too high. As such, a greater level of quantization may be utilized. When the recaptured frame data differs in frequencies of significance from the raw data, the level of quantization is too great, thus it needs to be reduced. As such, the encoder may include a self-checking mechanism to ensure that the encoder is processing the least amount of bits necessary to achieve a desired level of video and/or audio quality when recapturing the compressed data. In addition, the raw data is written back into memory for subsequent use as a reference frame.

Figure 2:
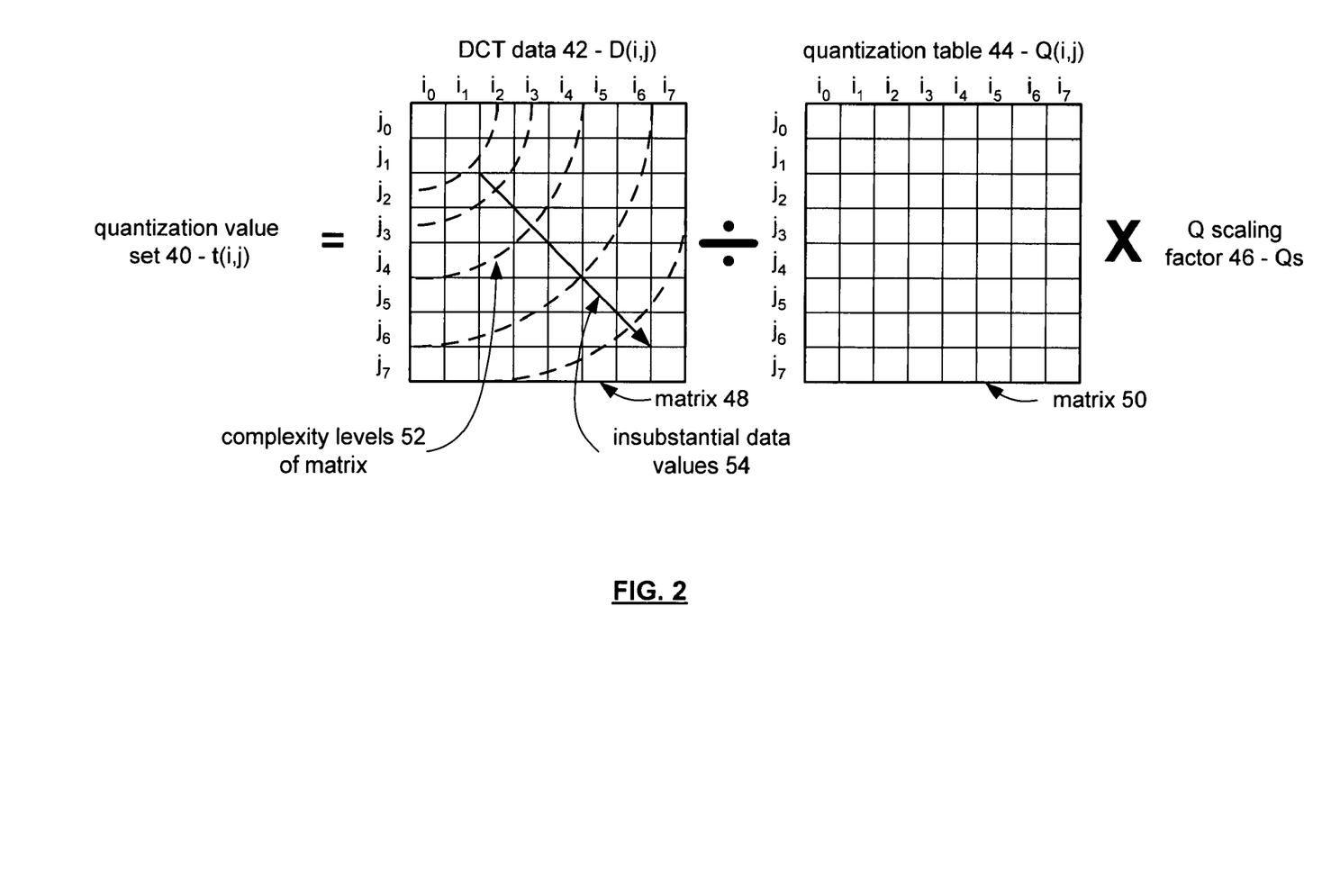
FIG. 2 illustrates a graphical representation of a quantization function in accordance with the present invention.

FIG. 2 illustrates a graphical representation of the quantization process utilized by quantizer 16. As shown, the DCT data 42 is an 8×8 matrix where the subscript i corresponds to the column number and the subscript j corresponds to the row number. The quantization table 44 ($Q(i,j)$) is an 8×8 matrix where i corresponds to the column number and j corresponds to the row number. As is known, the most relevant data in the DCT data 42 originates in the upper left (i.e., zero, zero)

position and decreases as the row and column number increase. As such, very simple frames of data (such as a picture of a blue sky) have data of significance only in a few positions within the matrix of the DCT data 42. As the complexity of the picture increases, frames of the picture will have data of significance in more and more of the matrix positions of the DCT data 42. As graphically illustrated, as the complexity of the picture increases, the complexity levels 52 of the matrix increases.

For simple pictures, ones having minimal complexity levels 52 of the matrix, there will be a substantial number of insubstantial data values 54. As the complexity level 52 of the matrix increases the number of insubstantial data values will decrease.

The quantization table 44 includes a plurality of values, which are used to divide the DCT data 42. An I frame will have a different default matrix than a B or P frame. The values in the quantization table increase in value as the row and column numbers increase. Accordingly, as the DCT data 42 is divided by the quantization table 44, the smaller data values of the DCT data are being divided by larger values than the larger data values, which produces the insubstantial data values 54. The resulting matrix will have a similar pattern of complexity levels of insubstantial data values as the DCT data 42. The resulting matrix is then multiplied by the scaling factor 46 (Qs). The scaling factor further reduces the values in the resulting matrix thus producing the quantization value set 40 ($T(I_{i,j})$).

By utilizing a plurality of scaling factors 46, a plurality of quantization value sets is obtained. This may be further illustrated with reference to FIG. 3.

Figure 3:
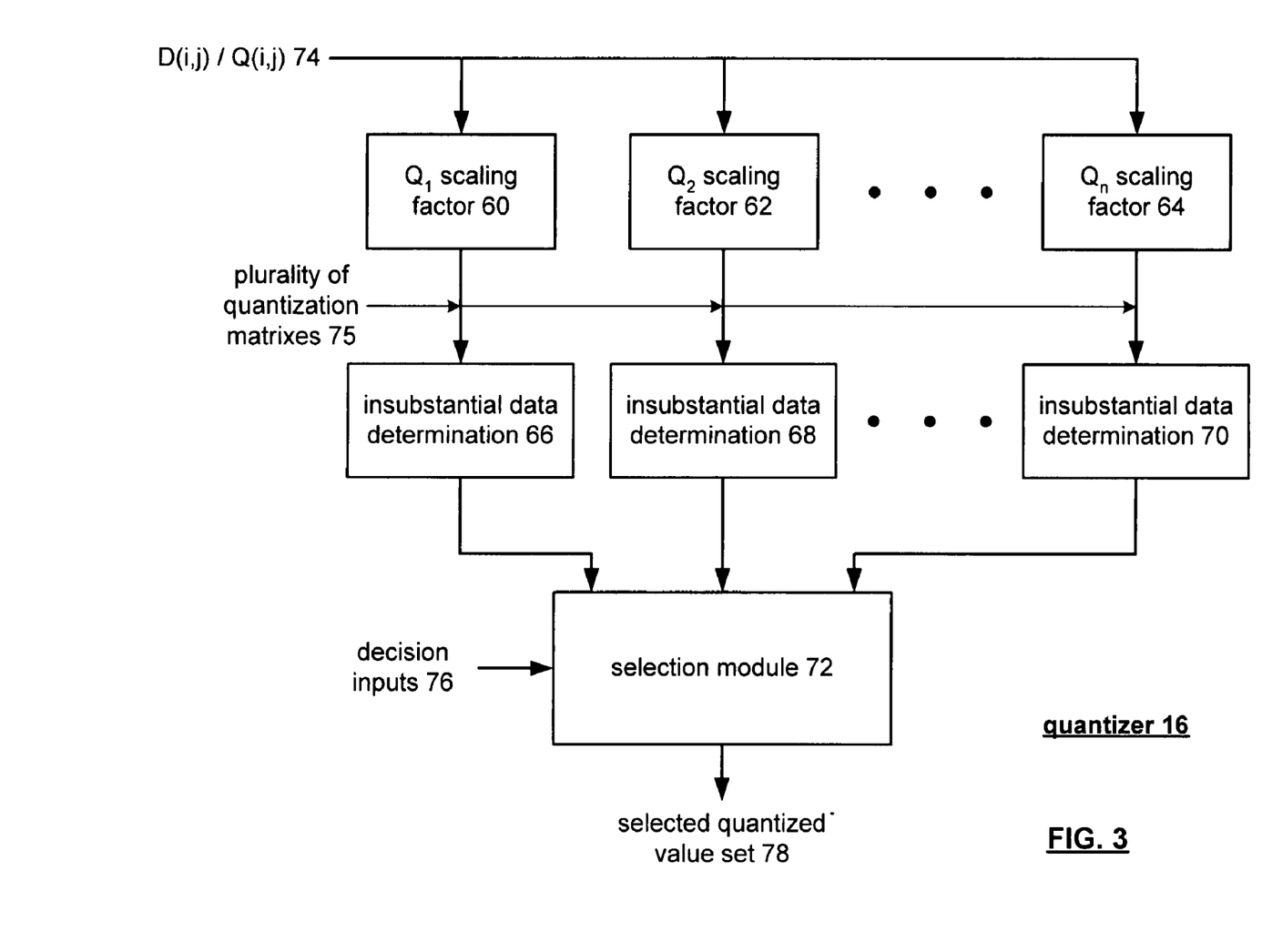
FIG. 3 illustrates a graphical representation of a quantizer in accordance with the present invention.

FIG. 3 illustrates quantizer 16 that includes a plurality of scaling factors (Q1-QN) 60-64, a plurality of insubstantial determination modules 66-70, and a selection module 72. Each of the scaling factor modules 60-64 is operably coupled to receive respective quantization matrix 75, which is the product of the DCT data divided by the quantization table 74. Each of the scaling factors 60-64 scales the resultant matrix 75 by the corresponding scaling factor (Q1-Qn). The output of each scaling factor module 60-64 is a quantized value set.

Each of the insubstantial data determination modules 66-70 receives a corresponding one of the quantized value sets from an associated scaling factor module 60-64. The insubstantial data determination module 66-70, for its respective quantized value set, determines a boundary of the resultant matrix data, which delineates data of significance from the insubstantial data. Such a determination corresponds with the level of complexity and insubstantial data as illustrated in FIG. 2. For example, the output of each insubstantial data determination module 66-70 may include a list of matrix positions by column and row of significant data and/or of insubstantial data. Alternatively, the output may indicate just a number of matrix positions that include substantial data and/or insubstantial data. Note that a data value in the resulting matrix is determined to be insubstantial if it is insignificant with respect to the data value in the (0,0) position of the matrix. Generally, data will be insignificant if it is $\frac{1}{20}^{th}$ to $\frac{1}{1000}^{th}$ of the (0,0) value. As is known, the (0,0) value corresponds to the DC component of the data.

The selection module 72 is operably coupled to each of the insubstantial data determination modules 66-70. The selection module 72, based on decision inputs 76, selects one of the quantized value sets from the scaling factor modules 60-64 as the selected quantized value set 78. The decision inputs 76 may be based on the complexity of the matrix of data values in the DCT data 42 where the greater complexity of the matrix results in a lower level of desired quantization and the lessor complexity of the matrix results in a higher level of desired quantization. Alternatively, the decision input 76 may be based on a desired number of insubstantial data values. Such a number of insubstantial data values corresponds to the level of complexity of the matrix. In addition, the decision input 76 may correspond to a desired level of video quality. As is known, as the level of quantization increases, the ability to recapture the raw data decreases thus decreasing the video quality. As such, the video quality threshold may be established to determine the level of insubstantial data that is allowable.

As an example of the operation of quantizer 16 of FIG. 3, assume that for a given picture the threshold for the number of insubstantial data values has been set to be 24, which means that 40 of the 64 positions in the matrix of the DCT data includes data of significance. Further assume, that the scaling factor Q1 is larger than scaling factor Q2 which is larger than scaling factor Q3, et cetera. As such, the output of scaling factor module 60 should have fewer resulting insubstantial values than the output of scaling factor 64.

The insubstantial data determination modules 66-70 receive the respective quantization matrix 75 and determine the number of insubstantial data values. For this example, assume that the insubstantial data determination module 66 determine that the quantization matrix 75 from scaling factor 60 has 22 insubstantial data values, while insubstantial data determination module 60 determines that the quantization matrix 75 from scaling factor module 62 has 23 insubstantial data values and further assume that the insubstantial data determination module 70 determines that the output of scaling factor module 64 has 24 insubstantial values. The selection module receives the indication of insubstantial data values in each of the corresponding matrixes. Based on the inputs that indicate that 24 insubstantial data values in the matrix is acceptable, selection module 72 would select the quantization matrix 75 from the scaling factor module 64. As such, by processing less of the matrix, less data is being processed by the encoder, thereby improving throughput and/or processing resources while maintaining a desired level of video quality.

Figure 4:
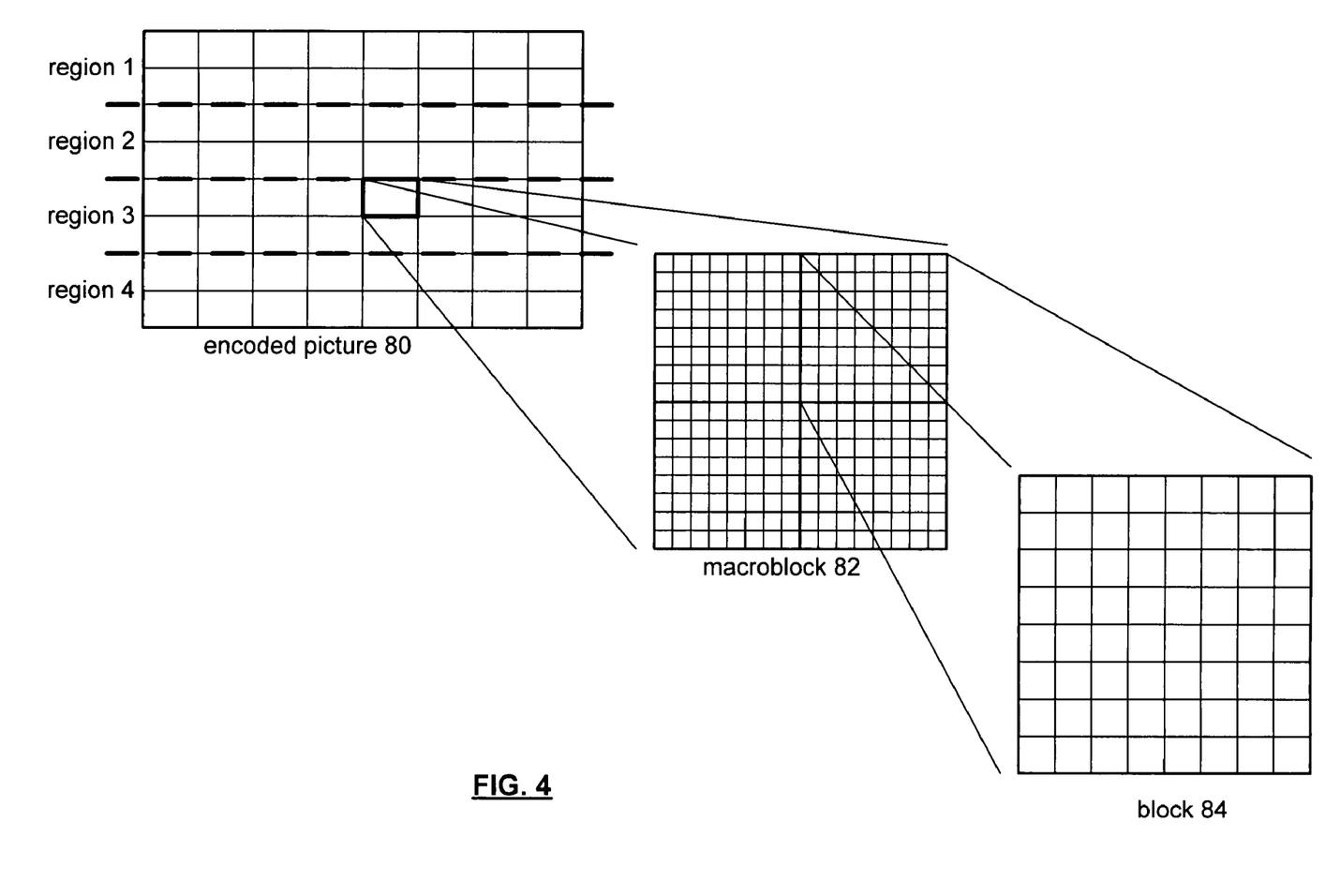
FIG. 4 illustrates a graphical representation of sectional quantizing in accordance with the present invention.

In addition to the various scaling factors utilized in FIG. 3 or as an alternative to the various scaling factors, a picture may be partitioned into regions as illustrated in FIG. 4. Each region is assigned a corresponding number of bits to quantize the data. If the number of bits for a preceding region is exceeded in quantizing the data, the scaling factor used to quantize the next region is reduced. From region to region, the cumulative bits used to quantize the data are maintained such that the overall encoded picture 80 is encoded utilizing approximately a desired number of bits.

As shown, the encoded picture includes a plurality of macro blocks. An MPEG encoded picture 80 includes 16×16 macro blocks. Each macro block 82 includes 16 samples×16 lines. The macro block 82 may be further divided into 4 blocks 84 that each includes 8 samples×8 lines. As such, the regional partitioning of the quantization of an encoded picture 80 may be done in regions as shown by regions 1-4, at the macro block level 82, and/or at the block level 84.

Figure 5:
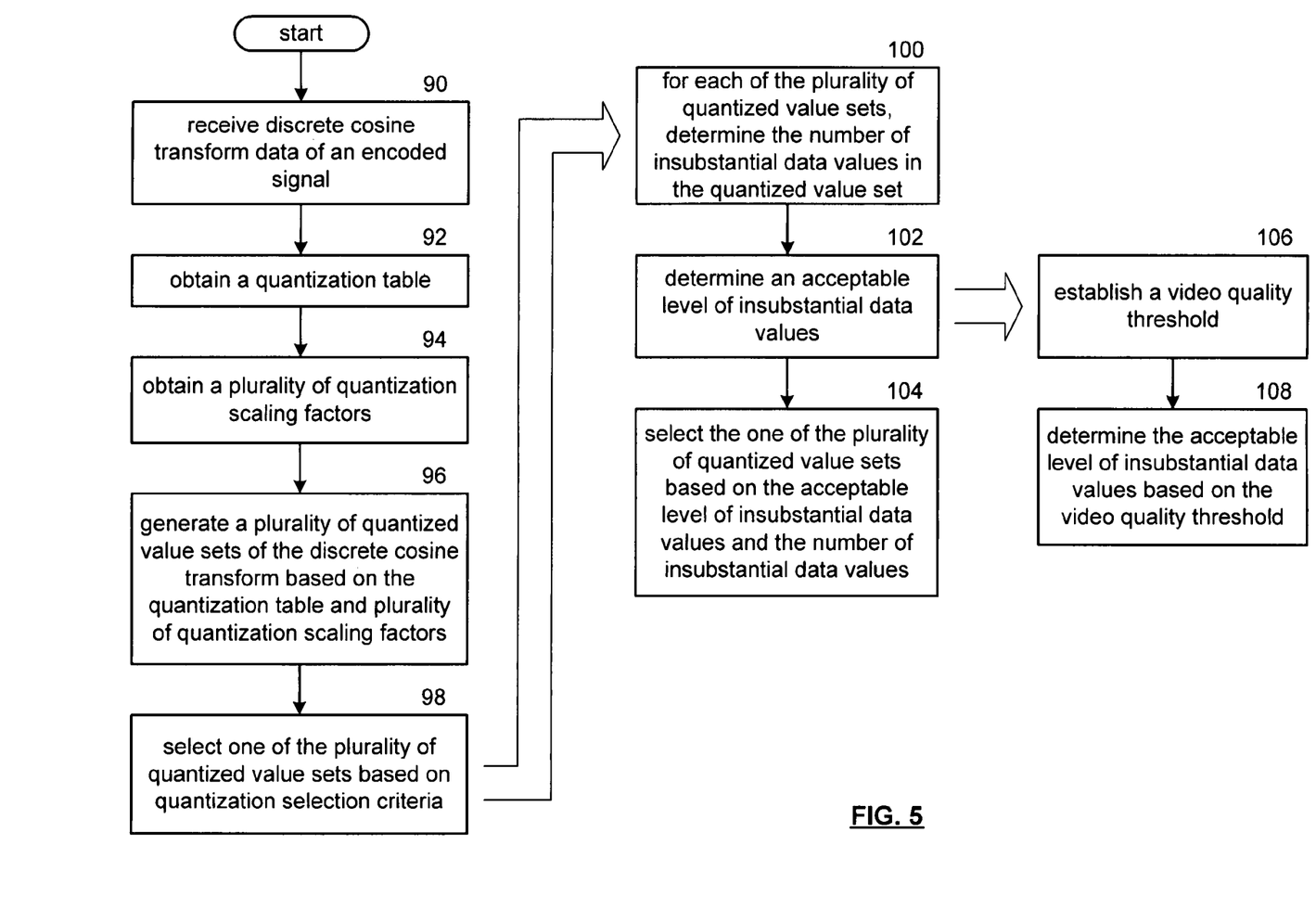
FIG. 5 illustrates a logic diagram of a method for selectable quantization in accordance with the present invention.

FIG. 5 illustrates a logic diagram of a method for selectable quantization. The process begins at Step 90 where discrete cosine transform data of an encoded signal is received. The discrete cosine transform data may be produced by performing a discrete cosine transform function upon a macro block of MPEG encoded data, wherein the discrete cosine transform data includes a matrix of data values. The process then proceeds to Step 92 where a quantization table is obtained. One type of quantization table was illustrated and discussed with reference to FIG. 2. The process then proceeds to Step 94 where a plurality of quantization scaling factors is obtained.

The process then proceeds to Step 96 where a plurality of quantized value sets are generated from the discrete cosine transform data based on the quantization table and the plurality of quantization scaling factors. This may be done by performing the equation $t(i,j)=D(i,j)/[Q(i,j)*Qs]$, where i represents a row number of the matrix, j represents a column number of the matrix, $t(i,j)$ represents a quantized value set of the plurality of quantized value sets, $D(i,j)$ represents the matrix of discrete cosine transform data, $Q(i,j)$ represents the quantization table, and Qs represents one of the plurality of quantization scaling factors.

The process then proceeds to Step 98 where one of the plurality of quantized value sets is selected based on quantization selection criteria. The quantization selection criteria may include the complexity of the matrix of data values wherein the greater the complexity of the matrix of data values results in a lower level of desired quantization and the lessor complexity of the matrix of data values results in a higher level of desired quantization.

As an alternative method for selecting one of the quantized value sets, the process may proceed to Steps 100-108. At Step 100, a determination is made for each of the plurality of quantized value sets to determine the number of insubstantial data values in the quantized value set. Insubstantial data values correspond to values within the matrix with respect to the DC value within the matrix. As is known, the DC value within the matrix corresponds to position zero, zero while AC components of the matrix correspond to the other positions in the matrix. Accordingly, when the data value is $1/20^{th}$ to $1/1000$ths or less than the DC component, the data may be determined to be insubstantial.

The process then proceeds to Step 102 where a determination is made as to an acceptable level of insubstantial data values. This may be done as shown in Steps 106 and 108. At Step 106, a video quality threshold is established. This is based on a desired level of resolution of the picture and may further be based on the type of picture. For example, if the picture includes a lot of motion and contrasting images, the threshold for insubstantial values would be lower, (i.e., wanting more data to be processed) than if the images contain little motion and little contrast. The process then proceeds to Step 108 where the acceptable level of insubstantial data values is determined based on the video quality threshold.

The process then returns to Step 104 where one of the plurality of quantized value sets is selected based on the acceptable level of insubstantial data values and the number of insubstantial data values.

Figure 6:
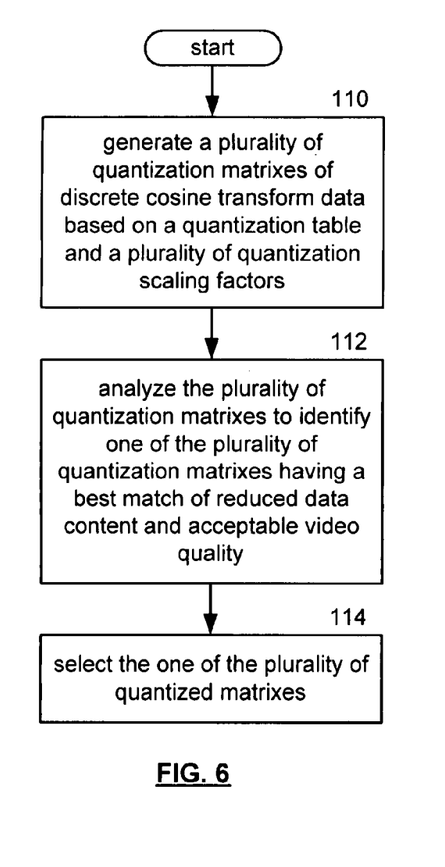
FIG. 6 illustrates a logic diagram of an alternate method for selectable quantization in accordance with the present invention.

FIG. 6 illustrates a logic diagram of an alternate method for selectable quantization. The process begins at Step 110 where a plurality of quantization matrixes is generated from discrete cosine transform data based on a quantization table and a plurality of quantization scaling factors. This may be done by performing the following equation $t(i,j)=D(i,j)/[Q(i,j)*Qs]$, where i represents a row number of the matrix, j represents a column number of the matrix, $t(i,j)$ represents a quantized value set of the plurality of quantized value sets, $D(i,j)$ represents the matrix of discrete cosine transform data, $Q(i,j)$ represents the quantization table, and Qs represents one of the plurality of quantization scaling factors. The discrete cosine transform data may be derived by performing a discrete cosine transform function upon a macro block of MPEG encoded data, where the discrete cosine transform data includes a matrix of data values.

The process then proceeds to Step 112 where the plurality of quantization matrixes is analyzed to identify one of the plurality of quantization matrixes having a best-match of reduced data content and acceptable video quality. This may be done by determining a number of insubstantial data values within each of the quantization matrixes. Having done this, a determination would then be made as to an acceptable level of insubstantial data values. Then, the best-match will be established based on the quantization matrix having substantially the same number of insubstantial data values as indicated by the acceptable level of insubstantial data values. For example, if the image being displayed is a blue sky, the number of insubstantial data values may be in the neighborhood of 60. Thus, if one quantization matrix has 55 insubstantial data values, another has 57, another has 60, the one having the 60 insubstantial data values would be utilized. This reduces the number of bits that needs to be processed to encode the video images while maintaining the desired level of video quality.

The process then proceeds to Step 114 where one of the plurality of quantized matrixes is selected for processing. [Move the last bit of the preceding paragraph to follow the paragraph with respect to Step 114].

Figure 7:
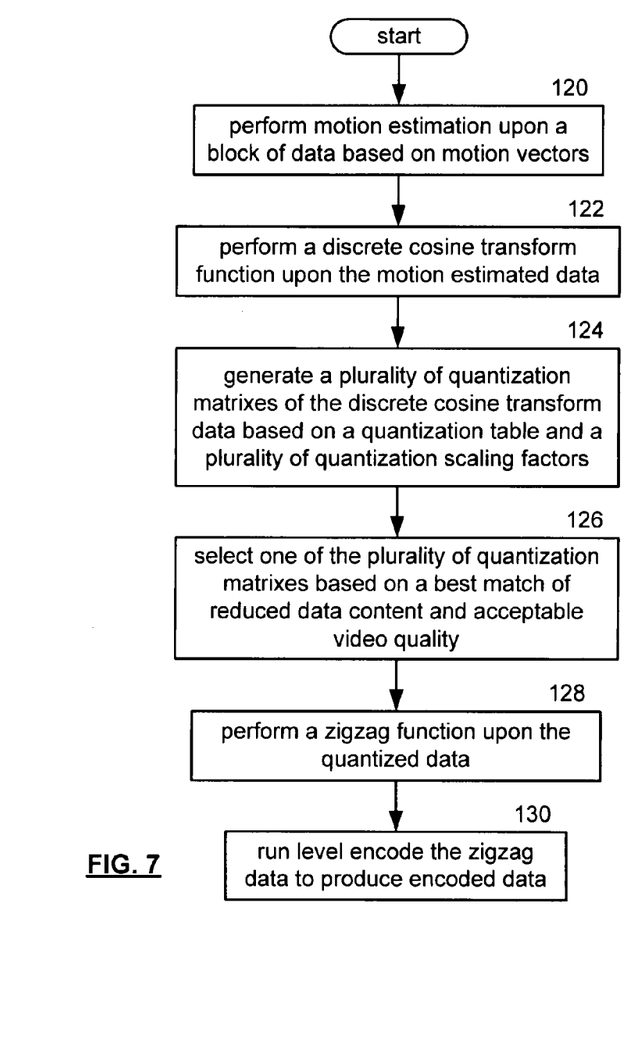
FIG. 7 illustrates a logic diagram of a further method for selectable quantization in accordance with the present invention.

FIG. 7 illustrates a logic diagram of a method for encoding data. The process begins at Step 120 where motion estimation is performed upon a block of data (which may be a macro block of MPEG encoded data) based on motion vectors. Such motion estimation was described with reference to FIG. 1. The process then proceeds to Step 122 where a discrete cosine transform function is performed upon the motion estimated data. The process then proceeds to Step 124 where a plurality of quantization matrixes of the discrete cosine transform data is generated based on a quantization table and a plurality of quantization scaling factors. This is a similar step as Step 96 of FIG. 5.

The process then proceeds to Step 126 where one of the plurality of quantization matrixes is selected based on a best-match of reduced data content and acceptable video quality. The process then proceeds to Step 128 where a zig-zag function is performed upon the quantized data. The process then proceeds to Step 130 where a run-level, or Huffman encoding is performed upon the zig-zag data to produce the resulting encoded data.

Figure 8:
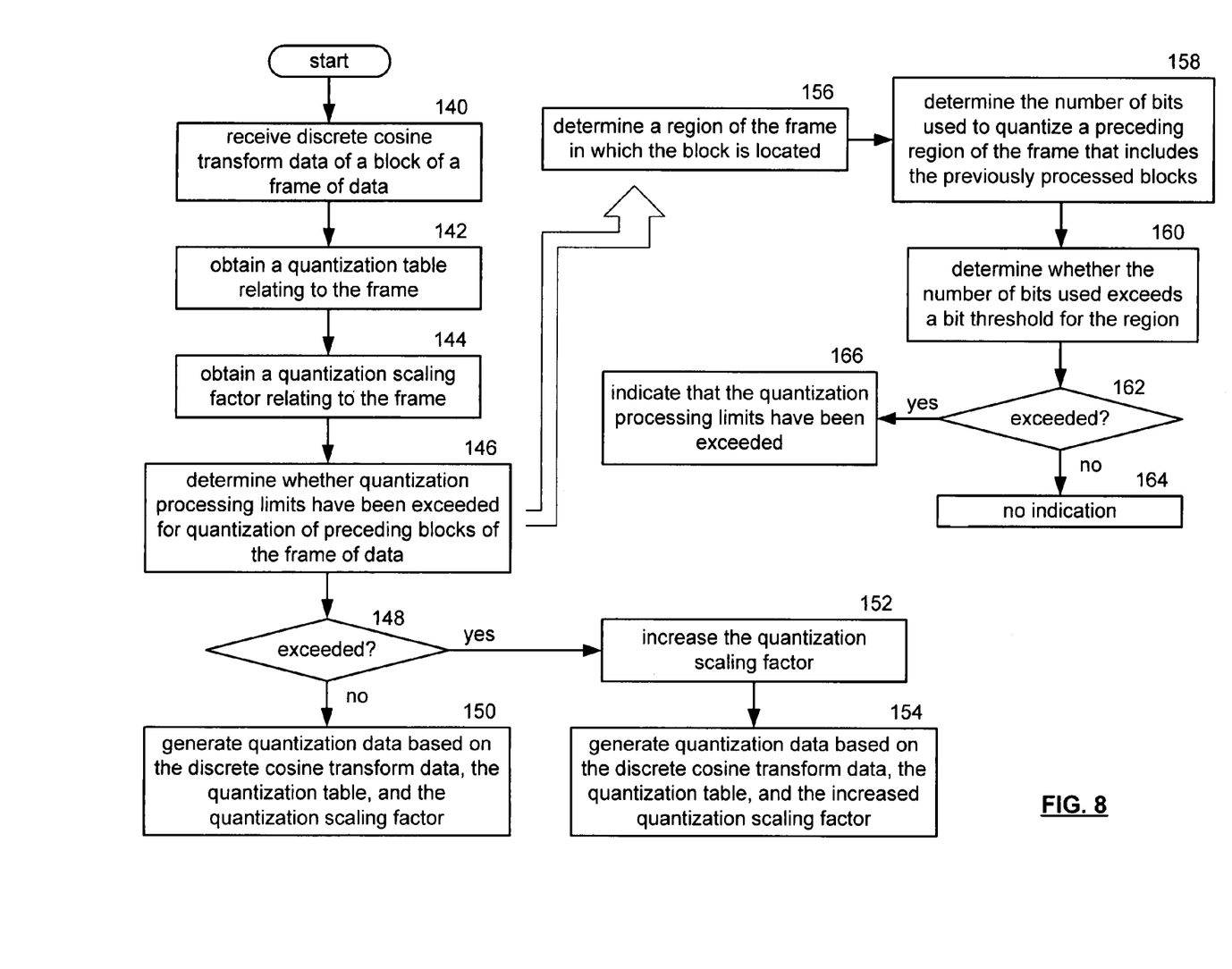
FIG. 8 illustrates a logic diagram of a method for controlling the amount of quantization processing in accordance with the present invention.

FIG. 8 illustrates a logic diagram of a method for controlling an amount of quantization processing. The process begins at Step 140 where discrete cosine transform data of a block of a frame of data is received. For example, the block of data may correspond to a macro block of an MPEG encoded video and/or audio frame. The process then proceeds to Step 142 where a quantization table is obtained for the particular frame of data. For example, if the frame of data being processed is an I frame of MPEG data, one type of quantization table will be retrieved. If the frame of data corresponds to a B or P frame, another quantization table would be retrieved.

The process then proceeds to Step 144 where a quantization scaling factor related to the frame is obtained. The quantization scaling factor may be determined by the desired level of video quality and/or an acceptable level of insubstantial data values. The process then proceeds to Step 146 where a determination is made as to whether quantization processing limits have been exceeded for quantization of preceding blocks of the frame of data. In general, the quantization of a frame of data has a predetermined level of processing resources to perform such a function. To ensure that the processing maintains within those limits, the frame of data is divided into regions. The regions may vary from bisecting the frame into two sections down to the block level as illustrated in FIG. 4.

One technique for determining whether the quantization processing limits have been exceeded is illustrated via Steps 156-166. At Step 156, a region of the frame in which the block that is currently being processed is determined. The processing then proceeds to Step 158 where a determination is made as to the number of bits used to quantize a preceding region of the frame that includes the previously processed blocks. The process then proceeds to Step 160 where a determination is made as to whether the number of bits used to process the preceding blocks exceeds a bit threshold for the region. The bit threshold corresponds to a linear allocation of the total number of bits available for processing a frame or some other desired function. At Step 162, a determination is made as to whether the threshold was exceeded. If not, the process proceeds to Step 164 where no indication that the processing limits have been exceeded is given. If, however, the threshold was exceeded, the process proceeds to Step 166 where an indication that the quantization processing limits have been exceeded is provided.

Returning to the main flow, at Step 148, the process branches based on whether the quantization processing limits have been exceeded. If not, the process proceeds to Step 150 where quantization data is generated based on the discrete cosine transform data, the quantization table and the quantization scaling factor.

If, however, the processing limits have been exceeded, the process proceeds to Step 152 where the quantization scaling factor is increased. By increasing the scaling factor, the level of quantization is increased, thus reducing the number of bits that needs to be processed to quantize the data results. The process then proceeds to Step 154 where quantization data is generated based on the discrete cosine transform data, the quantization table, and the increase quantization scaling factor.

Figure 9:
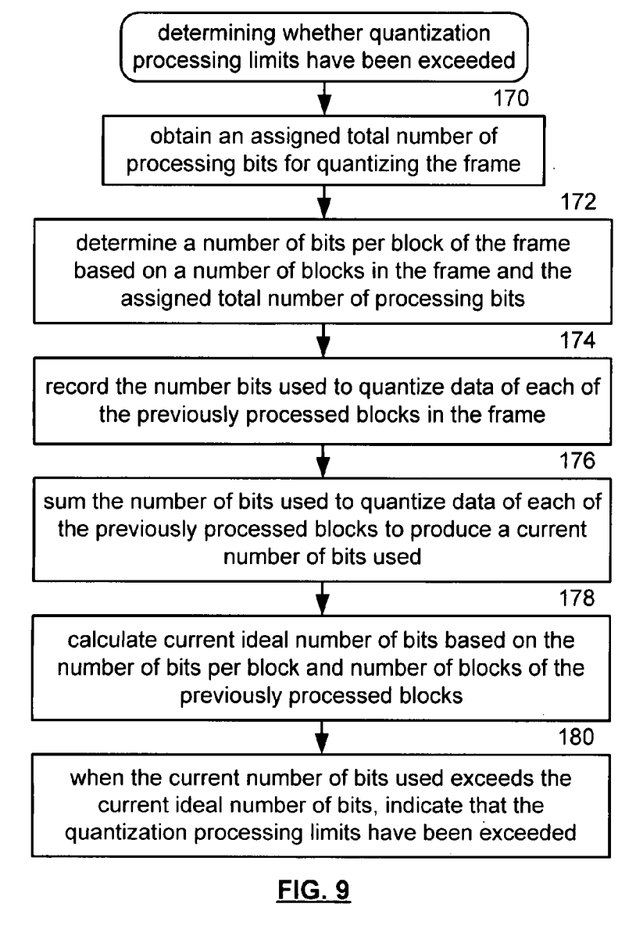
FIGS. 9 and 10 illustrate further processing of the method of FIG. 8.

FIG. 9 illustrates a logic diagram that further describes the determination of whether the quantization processing limits have been exceeded as indicated in Step 146 of FIG. 8. The process begins at Step 170 where an assigned total number of processing bits are quantizing the frame is obtained. Such a number will be based on the type of signal being encoded, the processing capabilities of the encoder and the number of other functions being supported by the processor. The process then proceeds to Step 172 where a determination is made as to the number of bits per block of the frame, which is based on a number of blocks in the frame and the assigned total number of processing bits. For example, if 1,000,000 bits are allocated for processing the frame and the frame is divided into 4 blocks, each block, or region, may have 250,000 bits for processing the block.

The process then proceeds to Step 174 where the number of bits used to quantize the data of each of the previously processed blocks in the frame is recorded. The process then proceeds to Step 176 where the number of bits used to quantize data of each of the previous processed blocks is summed to produce a current number of bits used. The process then proceeds to Step 178 where a current ideal number of bits is calculated based on the number of bits per block and a number of blocks of the previously processed blocks. For instance, utilizing the previous example of 1,000,000 bits for the entire frame where each block has 250,000 bits for processing the quantization, and further assuming that the $3^{rd}$ block is being processed, the current ideal number of bits would be 500,000, which corresponds to the $1^{st}$ 2 blocks each having 250,000 bits.

The process then proceeds to Step 180 where, when the current number of bits used exceeds the current ideal number of bits, indicating that the quantization processing limits have been exceeded. Continuing with the previous example, if the $1^{st}$ block required 245,000 bits to process and the $2^{nd}$ block required 270,000 bits, the cumulative bit number is 515,000 bits, which exceeds the current ideal number. Accordingly, the quantization scaling factor for block 3 would be increased such that the number of bits to quantize this particular block would be decreased.

Figure 10:
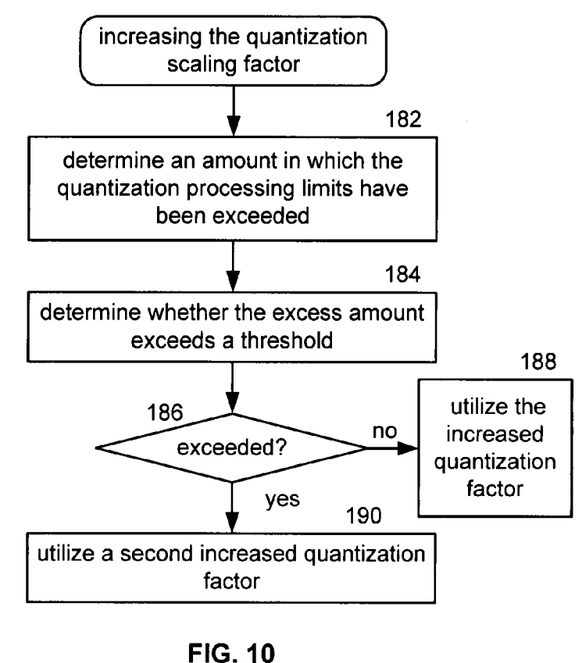

FIG. 10 illustrates further processing to increase the quantization scaling factor of Step 152 of FIG. 8. Such processing begins at Step 182 where an amount in which the quantization processing limits have been exceeded is determined. The process then proceeds to Step 184 where a determination is made as to whether the excess amount exceeds a threshold. At Step 186, the process branches based on whether the threshold has been exceeded. If not, the process proceeds to Step 188 where the increase quantized scaling factor is used. If, however, the threshold is exceeded, the process proceeds to Step 190 where a $2^{nd}$ increase quantization scaling factor is used, which further increases the quantization of the data with respect to the increase quantization scaling factor. In essence, what is being taught with respect to FIG. 10 is that if the number of bits used to process preceding blocks slightly or moderately exceeds the bit quantity, the scaling factor is incremented to the desired next level. If, however, the processing of a preceding block substantially exceeds the allocated bit processing level for the scaling factor may be further increased in multiple increments as opposed to a single increment.

Figure 11:
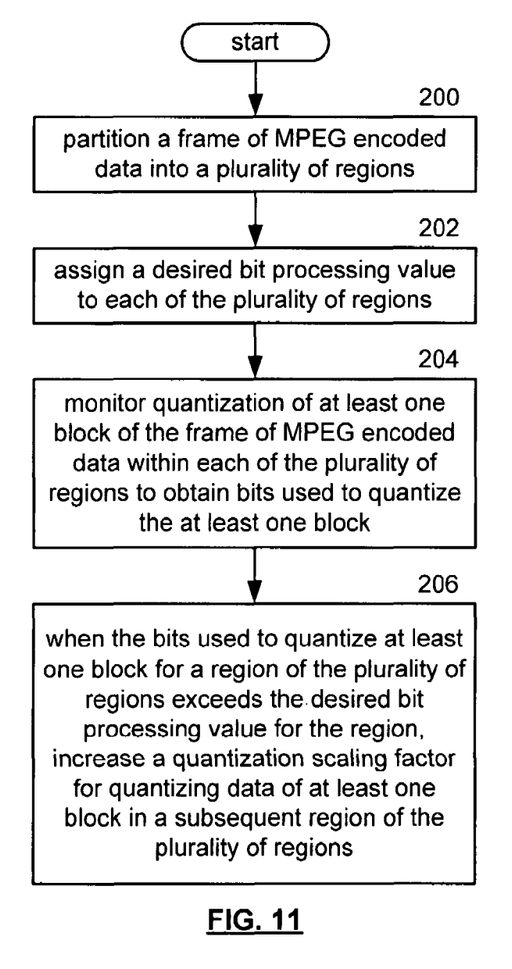
FIG. 11 illustrates a logic diagram of an alternate method for controlling the amount of quantization processing in accordance with the present invention.

FIG. 11 illustrates a logic diagram of an alternate method for controlling the amount of quantization processing. The process begins at Step 200 where a frame of MPEG encoded data is partitioned into a plurality of regions. This may be done by partitioning the MPEG encoded data on a macro block basis such that each macro block is an unique region, at the block level such that each block is an individual region or the MPEG encoded data may be divided into a number of regions where each region includes multiple macro blocks. Such a division was illustrated graphically with reference to FIG. 4.

The process then proceeds to Step 202 where a desired bit processing value is assigned to each of the plurality of regions. This may be done by dividing a total number of desired bits for quantizing the frame of data by the number of regions thus producing a linear allocation of bit processing.

The process then proceeds to Step 204 where quantization of at least one block of the frame of MPEG encoded data is monitored to obtain the number of bits used to quantize the block of data. The process then proceeds to Step 206 where, when the bits used to quantize the block for a region of the frame exceeds the desired bit processing value for the region, the quantization scaling factor for quantizing the data is increased. The increasing of the quantization scaling factor may be done as described with reference to FIG. 10.

Figure 12:
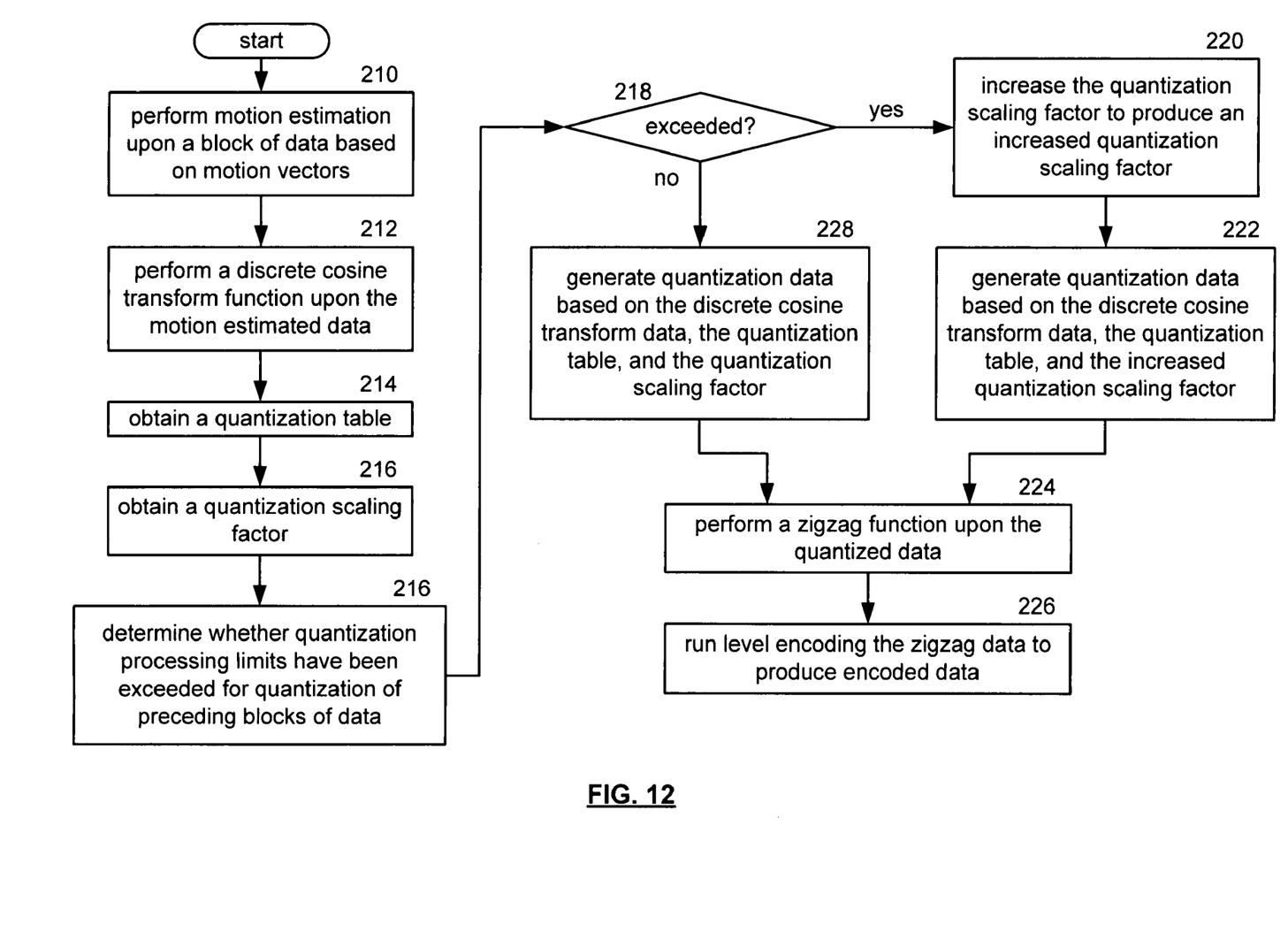
FIG. 12 illustrates a logic diagram of a further method for controlling the amount of quantization processing in accordance with the present invention.

FIG. 12 illustrates a logic diagram of a method for encoding data. The process begins at Step 210 where motion estimation is performed upon a block of data based on motion vectors. For example, if the data corresponds to MPEG data, the motion estimation performed was described with reference to FIG. 1. The process then proceeds to Step 212 where a discrete cosine transform function is performed upon the motion estimated data. The process then proceeds to Step 214 where a quantization table is obtained. The process then proceeds to Step 216 where a quantization scaling factor is obtained. The process then proceeds to Step 216 where a determination is made as to whether quantization processing limits have been exceeded for quantization of preceding blocks of data. Such a determination has been described with reference to FIGS. 8 through 11.

The process then proceeds to Step 218 where the process branches based on whether the quantization processing limits have been exceeded. If so, the process proceeds to Step 220 where the quantization scaling factor is increased to produce an increased quantization scaling factor. The process then proceeds to Step 222 where quantization data is generated based on the discrete cosine transform data, the quantization table and the increased quantization scaling factor.

If the quantization processing limits have not been exceeded, the process proceeds to Step 228. At Step 228, quantization data is generated based on the discrete cosine transform data, the quantization table and the initial scaling factor. The process then proceeds from Step 228 or Step 222 to Step 224. At Step 224, a zig-zag function is performed upon the quantized data. The process then proceeds to Step 226 where a run-level encoding and/or Huffman encoding is performed upon the zig-zag data to produce the desired encoding data.

The preceding discussion has presented a method and apparatus for reducing processing requirements within a video compression system while maintaining video quality for the recapturing of the video data. As one of average skill in the art will appreciate, other embodiments may be derived from the teaching of the present invention without deviating from the scope of the claims.

What is claimed is:

1. A method for selectable quantization for frame data in an encoder, the method comprises:
    generating via the encoder a plurality of quantization matrixes of discrete cosine transform data based on a quantization table and a plurality of quantization scaling factors;
    analyzing via the encoder the plurality of quantization matrixes to identify one of the plurality of quantization matrixes having a best match of reduced data content and acceptable video quality, by, for each of the plurality of quantization matrixes,
        determining number of insubstantial data values in the quantization matrix;
        determining an acceptable level of insubstantial data values; and
        establishing the best match as the one of the plurality of quantization matrixes having the number of insubstantial data values in accordance with the acceptable level of insubstantial data values;
    selecting the one of the plurality of quantized matrixes; and
    quantizing via the encoder a plurality of discrete cosine transform data with the selected one of the plurality of quantized matrixes to produce quantized data.

2. The method of claim 1, wherein the generating the plurality of quantization matrixes further comprises:
    performing $t(i,j)=D(i,j)/[Q(i,j)]*Qs$, where i represents a row number of a matrix, j represents a column number of the matrix, $t(i,j)$ represents a quantization matrix of the plurality of quantization matrixes, $D(i,j)$ represents the matrix of discrete cosine transform data, $Q(i,j)$ represents the quantization table, and Qs represents one of the plurality of quantization scaling factors.

3. The method of claim 1, wherein the determining the acceptable level of insubstantial data values further comprises:
    determining complexity of discrete cosine transform data; and
    setting a video quality threshold of acceptable number of insubstantial data values proportional to the complexity of the matrix of data values such that greater complexity results in the video quality threshold being larger and lesser complexity results in the video quality threshold being smaller.

4. The method of claim 1, wherein the generating the plurality of quantization matrixes further comprises:
    performing a discrete cosine transform function upon a macroblock of Motion Picture Expert Group (MPEG) encoded data to produce the discrete cosine transform data, wherein the discrete cosine transform data includes a matrix of data values.

5. A method for encoding frame data in an encoder, the method comprises:
    performing motion estimation via the encoder upon a block of data based on motion vectors to produce motion estimated data;
    performing via the encoder a discrete cosine transform function upon the motion estimated data to produce discrete cosine transform data;
    generating via the encoder a plurality of quantization matrixes of the discrete cosine transform data based on a quantization table and a plurality of quantization scaling factors;
    selecting via the encoder one of the plurality of quantization matrixes based on a best match of reduced data content and acceptable video quality to produce quantized data by, for each of the plurality of quantization matrixes,
        determining number of insubstantial data values in the quantization matrix; and
        determining an acceptable level of insubstantial data values;
    selecting via the encoder the one of the plurality of quantization matrixes as having the best match of the number of insubstantial data values in accordance with the acceptable level of insubstantial data values;
    quantizing via the encoder the discrete cosine transform data with the selected one of the plurality of quantized matrixes to produce quantized data;
    performing via the encoder a zigzag function upon the quantized data to produce zigzag data; and
    run level encoding the zigzag data to produce encoded data.

6. The method of claim 5, wherein the generating the plurality of quantization matrixes further comprises:
    performing $t(i,j)=D(i,j)/[Q(i,j)]*Qs$, where i represents a row number of a matrix, j represents a column number of the matrix, $t(i,j)$ represents a quantization matrix of the plurality of quantization matrixes, $D(i,j)$ represents the matrix of discrete cosine transform data, $Q(i,j)$ represents the quantization table, and Qs represents one of the plurality of quantization scaling factors.

7. The method of claim 5, wherein the determining the acceptable level of insubstantial data values further comprises:
    determining complexity of discrete cosine transform data; and
    setting a video quality threshold of acceptable number of insubstantial data values proportional to the complexity of the matrix of data values such that greater complexity results in the video quality threshold being larger and lesser complexity results in the video quality threshold being smaller.

8. An apparatus for selectable quantization of frame data, the apparatus comprises:
    processing module; and
    memory operably coupled to the processing module, wherein the memory includes operational instructions that cause the processing module to:

generate a plurality of quantization matrixes of discrete cosine transform data based on a quantization table and a plurality of quantization scaling factors;

analyze the plurality of quantization matrixes to identify one of the plurality of quantization matrixes having a best match of reduced data content and acceptable video quality by, for each of the plurality of quantization matrixes, determining number of insubstantial data values in the quantization matrix;

determining an acceptable level of insubstantial data values; and establishing the best match as the one of the plurality of quantization matrixes having the number of insubstantial data values in accordance with the acceptable level of insubstantial data values; and select the one of the plurality of quantized matrixes.

9. The apparatus of claim 8, wherein the memory further comprises operational instructions that cause the processing module to generate the plurality of quantization matrixes by:

performing $t(i,j)=D(i,j)/[Q(i,j)]*-Qs$, where i represents a row number of a matrix, j represents a column number of the matrix, $t(i,j)$ represents a quantization matrix of the plurality of quantization matrixes, $Q(i,j)$ represents the quantization table, and Qs represents one of the plurality of quantization scaling factors.

10. The apparatus of claim 9, wherein the memory further comprises operational instructions that cause the processing module to generate the plurality of quantization matrixes by:

performing a discrete cosine transform function upon a macroblock of Motion Picture Expert Group (MPEG) encoded data to produce the discrete cosine transform data, wherein the discrete cosine transform data includes a matrix of data values.

11. The apparatus of claim 8, wherein the memory further comprises operational instructions that cause the processing module to determine the acceptable level of insubstantial data values by:

determining complexity of discrete cosine transform data; and setting a video quality threshold of acceptable number of insubstantial data values proportional to the complexity of the matrix of data values such that greater complexity results in the video quality threshold being larger and lesser complexity results in the video quality threshold being smaller.

12. An apparatus for encoding frame data, the apparatus comprises:

processing module; and memory operably coupled to the processing module, wherein the memory includes operational instructions that cause the processing module to:

perform motion estimation upon a block of data based on motion vectors to produce motion estimated data;

perform a discrete cosine transform function upon the motion estimated data to produce discrete cosine transform data;

generate a plurality of quantization matrixes of the discrete cosine transform data based on a quantization table and a plurality of quantization scaling factors;

select one of the plurality of quantization matrixes based on a best match of reduced data content and acceptable video quality to produce quantized data by, for each of the plurality of quantization matrixes, determining number of insubstantial data values in the quantization matrix;

determining an acceptable level of insubstantial data values; and selecting the one of the plurality of quantization matrixes as having the best match of the number of insubstantial data values in accordance with the acceptable level of insubstantial data values;

perform a zigzag function upon the quantized data to produce zigzag data; and run level encode the zigzag data to produce encoded data.

13. The apparatus of claim 12, wherein the memory further comprises operational instructions that cause the processing module to generate the plurality of quantization matrixes by:

performing $t(i,j)=D(i,j)/[Q(i,j)]*-Qs$, where i represents a row number of a matrix, j represents a column number of the matrix, $t(i,j)$ represents a quantization matrix of the plurality of quantization matrixes, $D(i,j)$ represents the matrix of discrete cosine transform data, $Q(i,j)$ represents the quantization table, and Qs represents one of the plurality of quantization scaling factors.

14. The apparatus of claim 12, wherein the memory further comprises operational instructions that cause the processing module to determine the acceptable level of insubstantial data values by:

determining complexity of discrete cosine transform data; and setting a video quality threshold of acceptable number of insubstantial data values proportional to the complexity of the matrix of data values such that greater complexity results in the video quality threshold being larger and lesser complexity results in the video quality threshold being smaller.

* * * * *